US008898614B2

(12) United States Patent
Sharma et al.

(10) Patent No.: US 8,898,614 B2
(45) Date of Patent: Nov. 25, 2014

(54) INTEGRATED CIRCUIT DEVICE WITH REDUCED LEAKAGE AND METHOD THEREFOR

(75) Inventors: Puneet Sharma, Austin, TX (US); Magdy S. Abadir, Austin, TX (US); Scott P. Warrick, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 618 days.

(21) Appl. No.: 12/762,439

(22) Filed: Apr. 19, 2010

(65) Prior Publication Data

US 2011/0258588 A1 Oct. 20, 2011

(51) Int. Cl.
G06F 17/50 (2006.01)
G06F 9/455 (2006.01)
G06F 11/22 (2006.01)

(52) U.S. Cl.
CPC ........ G06F 17/5072 (2013.01); *G06F 2217/78* (2013.01); *G06F 2217/12* (2013.01)
USPC ............ 716/123; 716/119; 716/132; 716/136

(58) Field of Classification Search
None
See application file for complete search history.

(56) References Cited

U.S. PATENT DOCUMENTS

| 6,526,547 | B2* | 2/2003 | Breiner et al. ................... 716/56 |
| 6,614,062 | B2 | 9/2003 | Chheda et al. |
| 7,266,787 | B2* | 9/2007 | Hughes et al. ................ 257/374 |
| 7,383,521 | B2* | 6/2008 | Smith et al. .................... 716/114 |
| 7,600,207 | B2* | 10/2009 | Moroz et al. .................... 716/55 |
| 7,767,515 | B2* | 8/2010 | Moroz et al. .................. 438/221 |
| 7,895,548 | B2* | 2/2011 | Lin et al. ........................ 716/55 |
| 7,897,479 | B2* | 3/2011 | Lin et al. ........................ 438/424 |
| 7,996,795 | B2* | 8/2011 | Moroz et al. .................... 716/56 |
| 8,069,430 | B2* | 11/2011 | Moroz et al. ................. 716/122 |
| 2007/0202662 | A1 | 8/2007 | Lin et al. |
| 2007/0204250 | A1* | 8/2007 | Moroz et al. .................... 716/10 |
| 2009/0007043 | A1* | 1/2009 | Lin et al. ........................... 716/9 |
| 2009/0031261 | A1* | 1/2009 | Smith et al. ...................... 716/2 |
| 2009/0113368 | A1* | 4/2009 | Lin et al. ........................ 716/10 |
| 2009/0313595 | A1* | 12/2009 | Moroz et al. .................... 716/10 |
| 2010/0038728 | A1* | 2/2010 | Anderson et al. ............. 257/410 |
| 2010/0122231 | A1* | 5/2010 | Agarwal et al. ................. 716/19 |
| 2011/0078639 | A1* | 3/2011 | Lin et al. ........................ 716/55 |

OTHER PUBLICATIONS

Kahng, Andrew B. et al., "Exploiting STI Stress for Performance," Proc. AMC/IEEE International Conference on Computer-Aided Design, 2007, pp. 83-90.
Kahng, Andrew B. et al., "Fill for Shallow Trench Isolation CMP," ICCAD 2006, San Jose, CA, Nov. 5-9, 2006, 8 pages.
Moroz, Victor et al., "Stress-Aware Design Methodology," IEEE Intl. Symposium on Quality Electronic Design, 2006, 6 pages.

* cited by examiner

Primary Examiner — A. M. Thompson (57) ABSTRACT

A method includes preferentially placing fill regions adjacent to transistors of a particular conductivity type, such as p-channel transistors, for a plurality of standard cell instances of a device design. The method also includes evaluating all transistors of the first conductivity type prior to evaluating any transistors of a second conductivity type. The second conductivity type is opposite the first conductivity type. For each transistor being evaluated, it is determined whether a criterion is me. A fill region is placed within a field isolation region adjacent to the transistor if the criterion is met.

18 Claims, 9 Drawing Sheets

INTEGRATED CIRCUIT DEVICE WITH REDUCED LEAKAGE AND METHOD THEREFOR

FIELD OF THE DISCLOSURE

The present disclosure relates generally to data processing devices, and more particularly to the design of data processing devices.

BACKGROUND

Modern integrated circuit devices can include large numbers of transistors. Consequently, design engineers typically make use of design automation tools and associated techniques to increase their design productivity. For example, an integrated circuit data processing device can be implemented using logic components known as standard cells that the designer selects from a predefined standard cell library. Automated standard cell placement and signal routing tools can be used to assemble a device design that can include a virtual representation of the physical integrated circuit data processing device by instantiating and interconnecting symbolic representations of the standard cell circuitry at a computer-aided design (CAD) system. The CAD system can include automated processes to verify and improve performance and manufacturability of the integrated circuit data processing device. The virtual representation of the device can be designed and evaluated using the CAD system, and can then be used to manufacture the integrated circuit data processing device.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Design automation tools typically operate pursuant to design guidelines or rules directed towards improving the manufacturability, reliability, and performance of an integrated circuit device. For example, conforming to a design rule that governs the density of selected device features can improve planarity of the device's surface following chemical/mechanical etching procedures. For example, fill regions, which do not affect the logical functionality of an integrated circuit data processing device, can be added to the field isolation regions of an otherwise completed device design to ensure that a corresponding device is properly planarized during manufacturing. In accordance with a specific embodiment of the disclosure, these fill regions can be preferentially placed at the integrated circuit data processing device to reduce sub-threshold leakage of selected transistors introduced by adjacent field isolation regions. For example, placement of fill regions to reduce the sub-threshold leakage of certain device can be preferentially placed near those devices having intrinsically greater sub-threshold leakage characteristics in an effort to reduce sub-threshold leakage caused by field isolation regions. Furthermore, locations to place fill regions, and thereby reduce sub-threshold leakage, can be selected to limit adverse impacts on the timing performance of the device design that can result from the addition of fill regions.

As disclosed in accordance with a specific embodiment herein, a fill region can be included at a device design of an integrated circuit data processing device to reduce power dissipation caused by sub-threshold leakage of the transistors included at the device. A fill region can be preferentially placed at selected locations based on the type of fill region and based on characteristics of the associated semiconductor process technology. For example, fill regions can be placed proximate to transistors whose leakage is reduced by an adjacent fill region, while avoiding placement of fill regions near transistors that that are determined to not be favorably affected or that are adversely affected by the placement of a nearby fill region. In an embodiment, a fill region is an active region that can be preferentially placed adjacent to an active region of a p-channel transistors thereby reducing compressive stress on the transistors, such as a compressive stress that would be caused by a field isolation region that would have been otherwise placed at the location of the adjacent region. In another embodiment, a fill region corresponds to a void in a nearby shallow trench isolation (STI) region that is preferentially placed adjacent to the active region of a p-channel transistors. The void in the STI region can include a semiconductor material that reduces the amount of STI in the local vicinity of the transistors, reducing longitudinal compressive stress on the transistors caused by STI, and thereby reducing leakage at the transistors. In still another embodiment, a fill region can include a trench region fabricated to selectively provide either tensile or compressive stress to nearby transistor active regions. The type of fill region employed, and whether the fill regions are preferentially associated with p-channel transistors or n-channel transistors, is determined by the specific transistor fabrication process technology used to implement the integrated circuit data processing device.

Figure 1:
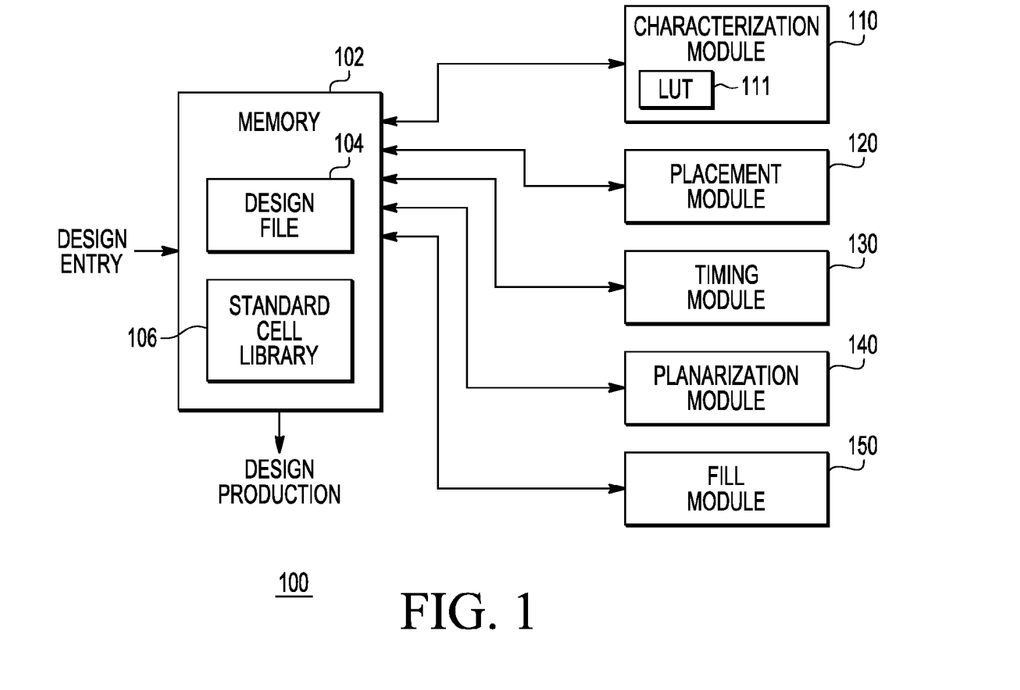
FIG. 1 is a block diagram illustrating a data processing device design system including computer-aided design (CAD) application modules in accordance with a specific embodiment of the present disclosure.

FIG. 1 is a block diagram illustrating a data processing device design system including computer-aided design (CAD) application modules in accordance with a specific embodiment of the present disclosure. Design system 100 is operable to facilitate the design of a data processing device such as an integrated circuit. Design system 100 includes a memory 102, a characterization module 110, a placement module 120, a timing module 130, a planarization module 140, and a fill module 150. Characterization module 110 includes a look up table (LUT) 111. Memory 102 includes a design file 104 and a standard cell library 106. The representation of the data processing device at design system 100 is referred to herein as a device design.

In one embodiment, application modules 110, 120, 130, 140, and 150 are hardware or software modules that can each be executed as described herein to perform an associated design function. Characterization module 110 is operable to evaluate a standard cell of a standard cell library to determine electrical and timing characteristics of the standard cell and of the included transistors. For example, characterization module 110 can simulate how quickly a signal can propagate from an input to an output of a standard cell. Characterization module 110 can also determine the magnitude of sub-threshold leakage associated with each transistor included in a standard cell. Placement module 120 is operable to determine the placement (physical location) of each standard cell at an integrated circuit device. Timing module 130 is operable to simulate a signal propagation delay associated with each logic path of a device design to verify that the completed integrated circuit device will operate pursuant to its specification. Planarization module 140 is operable to provide information as to the uniformity of various physical features of a device design that is used to implement fill regions at a device design to ensure an integrated circuit device can be manufactured having a proper planarity. Fill module 150 is operable to determine the placement of fill regions following placement of standard cells at a device design. Fill module 150 can preferentially place fill regions at locations of a device design to reduce device power dissipation caused by sub-threshold leakage.

A standard cell library 106 includes a plurality of predefined standard cells that can include logic devices and analog devices that are instantiated in a device design to implement an integrated circuit data processing device. A standard cell typically includes multiple models and views (viewpoints) that are provided to represent various aspects of the standard cell. For example, a standard cell can include a functional model that documents the logic operation performed by the standard cell, a timing model that provides signal propagation information for the standard cell, a circuit netlist that describes the transistor level connectivity of the standard cell, and physical views, such as a LEF view, that describes physical attributes of the standard cell such as the location of physical interface terminals. A device design stored at design file 104 is defined by a plurality of instantiations of standard cells from standard cell library 105 and information identifying the how the standard cell instances are interconnected. For example, a counter device can be implemented using one or more instantiations of a specific flip flop and combinatorial logic gates included at a standard cell library.

Design file 104 represents one or more databases used for storing a representation of a device design, such as a data processing device, and its associated attributes. Design file 104 is stored at memory 102 and can receive design information from design engineers and additional design properties and parameters from associated databases. Design file 104 can include an application programming interface (API) to permit the CAD application modules to access and manipulate device design attribute. A device design at design file 104 can represent a device using one or more models and views. For example, the device design can include a register-transfer level (RTL) model that provides a functional description of the device, a gate level representation of the device, and a transistor level representation of the device. Design file 104 can include additional device design attributes such as any information that a design engineer and the CAD application modules need to develop and model the device. When the design process is complete, the information stored at design file 104 can be used for production of the data processing device. For example, design file 104 can include a representation of a data processing device design that includes information relating to physical photo-mask features that are provided to an integrated circuit manufacturing facility.

Design system 100 includes application modules that are configured to manipulate device design information. Each of the application modules, including modules 110, 120, 130, 140, and 150 can manipulate device design information included at design file 104 to transform the representation of the device in a desired way.

Characterization module 110 is operable to analyze the operation of a standard cell. In one implementation, characterization module 110 can analyze the operation of a standard cell based on a transistor-level netlist model of the standard cell to simulate the timing behavior of the standard cell and to determine a total sub-threshold leakage associated with the standard. For example, characterization module 110 can use transistor-level circuit modeling procedures to determine a set-up time of an input at the standard cell, a rate at which an output of the standard cell transitions based on a set of output loads, and other operational characteristics of the standard cell. In addition, characterization module 110 can determine transistor or standard cell leakage information based on model information or based upon a lookup table, such as look up table 111 that can associate leakage information with physical dimensions of a transistor, the name of the standard cell, or the like. Characterization module 110 can rank each standard cell based on a total amount of sub-threshold leakage of the cell based on the cumulative leakage of each included transistor. In an embodiment, characterization module 110 can provide two rankings of the standard cells at standard cell library 106, one ranking corresponding to leakage at p-channel transistors, and another ranking corresponding to the leakage of n-channel transistors. Characterization module 110 can determine the operating characteristics of each standard cell at standard cell library 106 based on a contextual assumption as to the manner in which the standard cell will be placed at an integrated circuit. Generally, each standard cell is typically characterized as if it were placed in a single context, such as a worst-case context. Results of the characterization procedure can be stored at standard cell library 106 at memory 102.

Placement module 120 is operable to determine placement of each standard cell of a device design. Placement module 120 generally places standard cells in rows, each row typically having a consistent height corresponding to a respective height of a majority of the standard cells. Placement module 120 also can place a dummy cell adjacent to a portion of standard cells of a device design. Dummy cells generally do not include any transistors, and can be placed throughout a device design to provide channels for routing signal interconnects.

Timing module 130 is operable to determine the timing characteristics of a device design, including the timing behavior of each synchronous logic path included at the device design. The timing behavior of a logic path includes timing slack, wherein a positive timing slack value indicates that the timing performance of a logic path exceeds the performance required by the frequency of an associated clock signal, and a negative slack value indicates that the timing performance of the logic path fails to meet the performance required by the frequency the associated clock. A standard cell that is included in a logic path having insufficient positive slack is a timing-critical standard cell. Conversely, a standard cell satisfies a device design timing criterion if each logic path that includes the standard cell operates with a timing margin greater than a predefined amount. The timing information determined by timing module 130 can be used to further guide placement module 120 in determining the placement location of each standard cell of the device design to improve the timing performance of an associated logic path. Furthermore, fill module 150 can use timing slack information associated with each logic path of the device design to determine preferred locations to place fill regions as will be discussed in greater detail herein.

Planarization module 140 is operable to analyze physical features, such as diffusion areas, of a device design to determine the density of various regions of the device design. Based upon the analysis, the planarization module can identify, and provide density information, for localized portions of the device design that is used by fill module 150 to add fill regions to the device design to ensure proper planarization the manufacturing of the integrated circuit. For example, planarization module can determine how many fill regions are to be placed at a portion of a device design based on an analysis of the layout density of active-layer features at the portion.

Therefore, the planarity of the integrated circuit following chemical-mechanical polishing can be improved by selectively controlling the uniformity and density of design features at the localized portions of the device design. For example, planarization module 140 can determine whether sufficient active-area is present at each localized portion of the device design. Information provided by planarization module 140 is generally expressed in the form of density ratios. For example, a selected localized portion of a device design may include an active-layer density of fifty percent. The density information provided by planarization module 150 can be compared to design guidelines to determine if sufficient active-layer is present in that localized portion of the device design, or whether additional fill regions should be added to each portion of the device design to satisfy the density ratio specified by the design guidelines.

Fill module 150 is operable to determine the placement location of fill regions following placement of standard cells at a device design. Fill module 150 can preferentially place fill regions at locations selected to reduce power dissipation caused by sub-threshold leakage and based on additional criteria. For example, fill module 150 can add fill regions to the device design to satisfy deficiencies in active-layer density identified by planarization module 140 by selecting locations for the fill regions that will result in an improvement in sub-threshold leakage. Fill module 150 can utilize timing information provided by timing module 130 to limit adverse timing effects that can result if fill regions are located near instantiations of standard cells that are included in timing-critical logic paths. Fill module 150 can utilize standard cell leakage information provided by characterization module 110 to select locations that are adjacent to transistors that will most effectively reduce sub-threshold leakage. The operation of fill module 150 is described below with reference to FIGS. 2-10.

Figure 2:
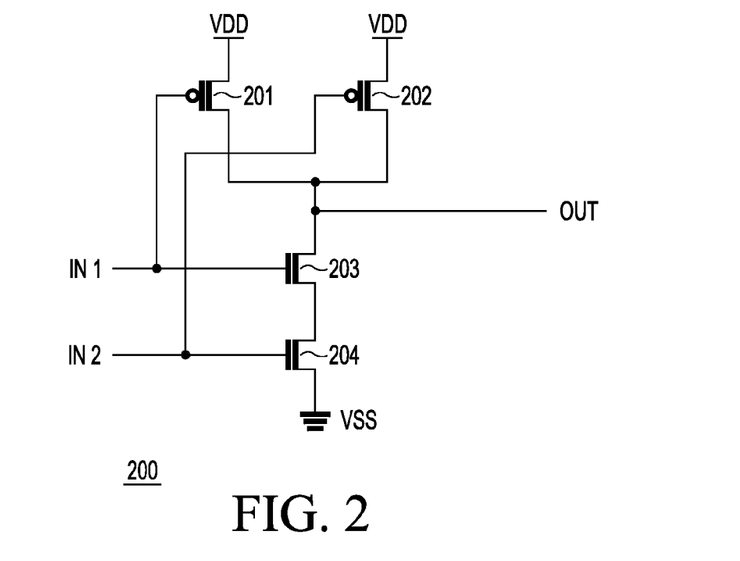
FIG. 2 is a schematic diagram illustrating transistors associated with a standard cell in accordance with a specific embodiment of the present disclosure.

FIG. 2 is a schematic diagram illustrating a standard cell 200 in accordance with a specific embodiment of the present disclosure. Standard cell 200 is representative of a standard cell included at standard cell library 106 of FIG. 1. A schematic diagram, such as that illustrated, specifies how individual transistors that make up the standard cell are interconnected in addition to other attributes (not shown at FIG. 2) such as the size of each transistor. The information represented at the schematic diagram of FIG. 2, can be represented by a transistor netlist stored at standard cell library 106.

Standard cell 200 includes two p-channel field effect transistor (FET) devices including transistors 201 and 202, and two n-channel FET devices including transistors 203 and 204. Transistor 201 has a source connected to a voltage reference node labeled VDD, a gate connected to an input node labeled IN1, and a drain connected to a node labeled OUT. Transistor 202 has a source connected to node VDD, a gate connected to an input node labeled IN2, and a drain connected to node OUT. Transistor 203 has a drain connected to node OUT, a gate connected to node IN1, and a source. Transistor 204 has a drain connected to the source of transistor 203, a gate connected to node IN2, and a source connected to a voltage reference node labeled VSS. Together, transistors 201-204 implement a logic gate providing a NAND logic function (a NAND gate). Other standard cells included at standard cell library 206 can provide other Boolean logic functions, latching components, analog functions, and the like. While field effect transistors, such as metal oxide semiconductor field effect transistors (MOSFETs), are illustrated at FIG. 2, another transistor technology, such as junction-FET or bipolar can be used without departing from the scope of the present disclosure. Furthermore, transistors 201-204 can be fabricated using a variety of process technologies such as bulk silicon, silicon-on-insulator (SOI), silicon-germanium, and the like.

During operation of design system 100, characterization module 110 can receive a transistor level netlist of a standard cell, such as standard cell 200, and analyze the operation of a particular instance of the standard cell in a device design. For example, characterization module 110 can determine the rate at which transistors 201-204 switch for a given input signal, and thus determine a delay and a rate at which the state of a signal at output node OUT transitions in response to a state transition of signals at input nodes IN1 and IN2. In an embodiment, characterization module 110 can identify the amount of sub-threshold leakage associated with the operation of each of transistors 201-204. Sub-threshold leakage information associated with a transistor can be determined using a look-up table, such as lookup table 111, based on the width and length of the transistor, the leakage information of the look-up table provided for a particular semiconductor fabrication process. Sub-threshold leakage information associated with a standard cell can include a single value corresponding to a sum of the leakage of individual transistors included in the cell, or leakage associated with p-channel devices can be maintained separate from that of n-channel devices. In still another embodiment, separate leakage values can be determined that are associated with the logic state of the standard cell. For example, sub-threshold leakage information can be determined based on whether the logic value of node OUT, or based on the logic value at nodes IN1 and IN2, respectively. Fill module 150 can use the leakage information to identify preferred locations to place fill regions. For example, fill module 150 can assign higher priority to locations adjacent to transistors or standard cells having higher leakage characteristics when determining where to place a finite allotment of fill regions.

Figure 3:
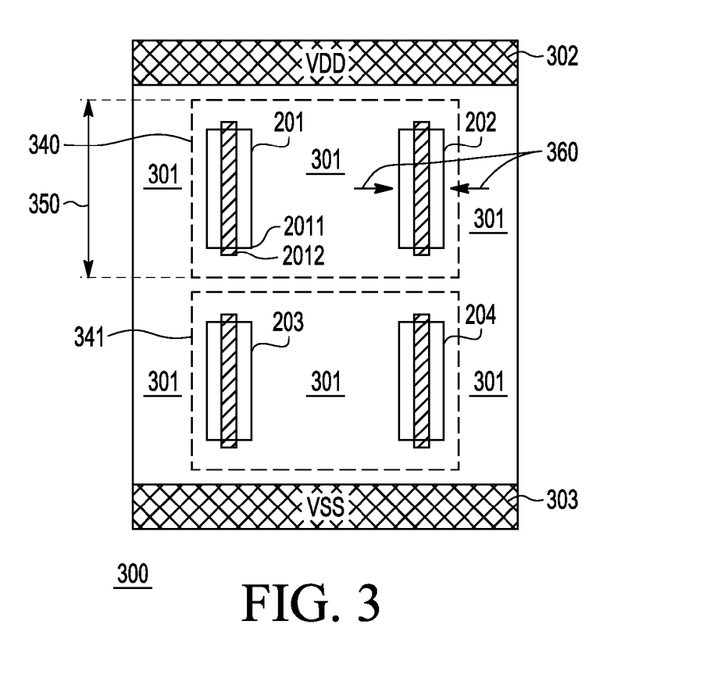
FIG. 3 is a block diagram illustrating a layout view of the standard cell of FIG. 2 in accordance with a specific embodiment of the present disclosure.

FIG. 3 is a block diagram illustrating a layout view 300 of standard cell 200 of FIG. 2 in accordance with a specific embodiment of the present disclosure. A layout view of a standard cell is a plan view that includes a plurality of polygonal objects representative of corresponding mask information used to implement features of the devices included at the standard cell, such as diffusion areas, gate electrode areas, metal interconnects, contacts, and the like. Layout view 300 is a simplified layout view of standard cell 200 depicting selected features associated with transistors 201-204. For example, layout view 300 includes polygons representing the transistor active area that includes the drain/source/channel of each transistor, such as polygon 2011, and the transistor gate area of each transistor, such as polygon 2012. Metal traces and other conductors that serve to interconnect transistors 201-204 are not show at FIG. 3 for clarity. However, conductive regions, presumed to be metal traces, that correspond to voltage reference node VDD and to voltage reference node VSS are illustrated. A representation of layout view 300 can be instantiated at a device design by placement module 120 with instantiations of this and other standard cells to define the locations where standard cells of an integrated circuit data processing device are to be located.

As previously discussed, a layout view, such as layout view 300 of the standard cell illustrated at FIG. 3, is one of a plurality of design models and views used to represent a data processing device and maintained at design file 104. A physical representation of a standard cell that can be instantiated at a device design is generally referred to as a LEF (layout exchange format) view. A LEF view of a standard cell is similar to layout view 300 but includes only particular physical information that is required by physical layout-oriented application modules, such as placement module 120. For illustration, layout view 300 also includes area 340 identifying the approximate location of p-channel transistors and area 341 identifying the approximate location of re-channel transistors included at standard cell 200. Dimension 350 identifies the height of area 340, which corresponds approximately to the vertical dimension of p-channel transistors 201 and 202 (and corresponds to the channel-width of each transistor). Surrounding transistors 201-204 is field isolation, such as STI region 301.

For the purpose of example, it is herein assumed that the STI region and active regions are mutually exclusive of each other. In other words, any location that is not designated as active will instead include STI. Therefore, a fill region can represent a void in an STI region, the void corresponding to an active region that does include STI. For examples described below, a fill region corresponds to an active region, and may or may not include drain/source diffusion. Accordingly, fill regions described below can be referred to as diffusion-fill regions, though one skilled in the art will appreciate that fill regions can also include other physical/chemical structures such as trenches and the like, which can be preferentially placed to reduce sub-threshold leakage at selected nearby transistors. As used herein, the term longitudinal used in association with a transistor or a standard cell represents a direction of current flow between the drain and source of the transistor.

The presence of STI 301 can modify the electrical behavior of transistors to which it is adjacent, and the effect can be different based on the type of transistor (p-channel or n-channel), the process technology, the location of the STI, the area of the STI region relative to each transistor, and the like. For the purpose of illustration, the following description illustrates how fill regions, defining active regions, can be placed adjacent to p-channel transistors in a longitudinal direction to reduce longitudinal compressive stress at p-channel transistors caused by STI 301. Arrows 360 illustrate longitudinal compressive stress at transistor 202. As used herein, a p-channel transistor is a PMOS (p-channel metal oxide semiconductor) transistor fabricated on a silicon substrate.

For the purpose of the following description, it is assumed that longitudinal compressive stress increases sub-threshold leakage of p-channel transistors, and decreases leakage at n-channel transistors. Consequently, fill module 150 (FIG. 1) attempts to reduce sub-threshold leakage at p-channel devices by preferentially placing fill regions in closer proximity to p-channel transistors and further from n-channel transistors. Accordingly, fill module 150 exhausts substantially all opportunities to place a fill region longitudinally adjacent to a p-channel transistor before evaluating substantially any locations longitudinally adjacent to n-channel transistors. One skilled in the art will appreciate that transistors fabricated using another manufacturing process can respond differently to stress, and fill module 150 can determine a preferred location to place filler regions accordingly. For example, if compressive longitudinal stress was instead correlated with increased sub-threshold leakage at n-channel transistors, fill regions can instead be placed longitudinally adjacent to selected n-channel transistors.

Figure 4:
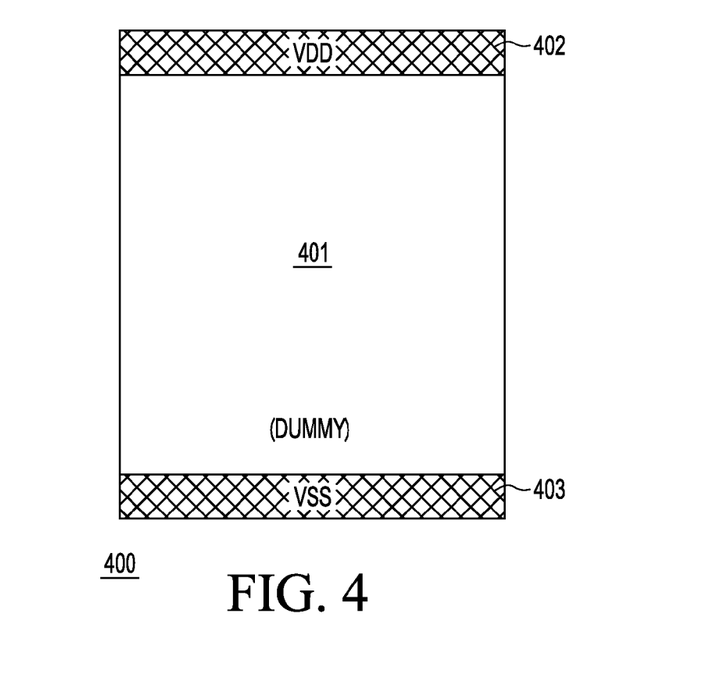
FIG. 4 is a block diagram illustrating a layout view of a dummy cell in accordance with a specific embodiment of the present disclosure.

FIG. 4 is a block diagram illustrating a layout view 400 of a dummy cell in accordance with a specific embodiment of the present disclosure. A dummy cell is a standard cell that is used to fill in, e.g., reserve, horizontal spaces between standard cells, if such a space is needed. A dummy cell generally does not include active devices, such as transistors or logic gates that contribute to the logical functionality of the data processing device. Dummy cells can be placed throughout a device design to provide channels for routing signal interconnects. Metallization can be included at a dummy cell to interconnect power and ground voltage references from one standard cell to another. Furthermore, a dummy cell can include significant STI regions that can adversely affect the leakage characteristics of nearby standard cells. Layout view 400 includes STI region 401, metallization 402 corresponding to voltage reference node VDD, and metallization 403 corresponding to voltage reference node VSS. Additional features, including fill regions, can be added to selected instantiations of dummy cells after the standard cells and dummy cells have been placed at a device design by placement module 120. However, the placement location of a standard cell or that of a dummy cell is not typically altered during the subsequent placement of fill regions by fill module 150.

Figure 5:
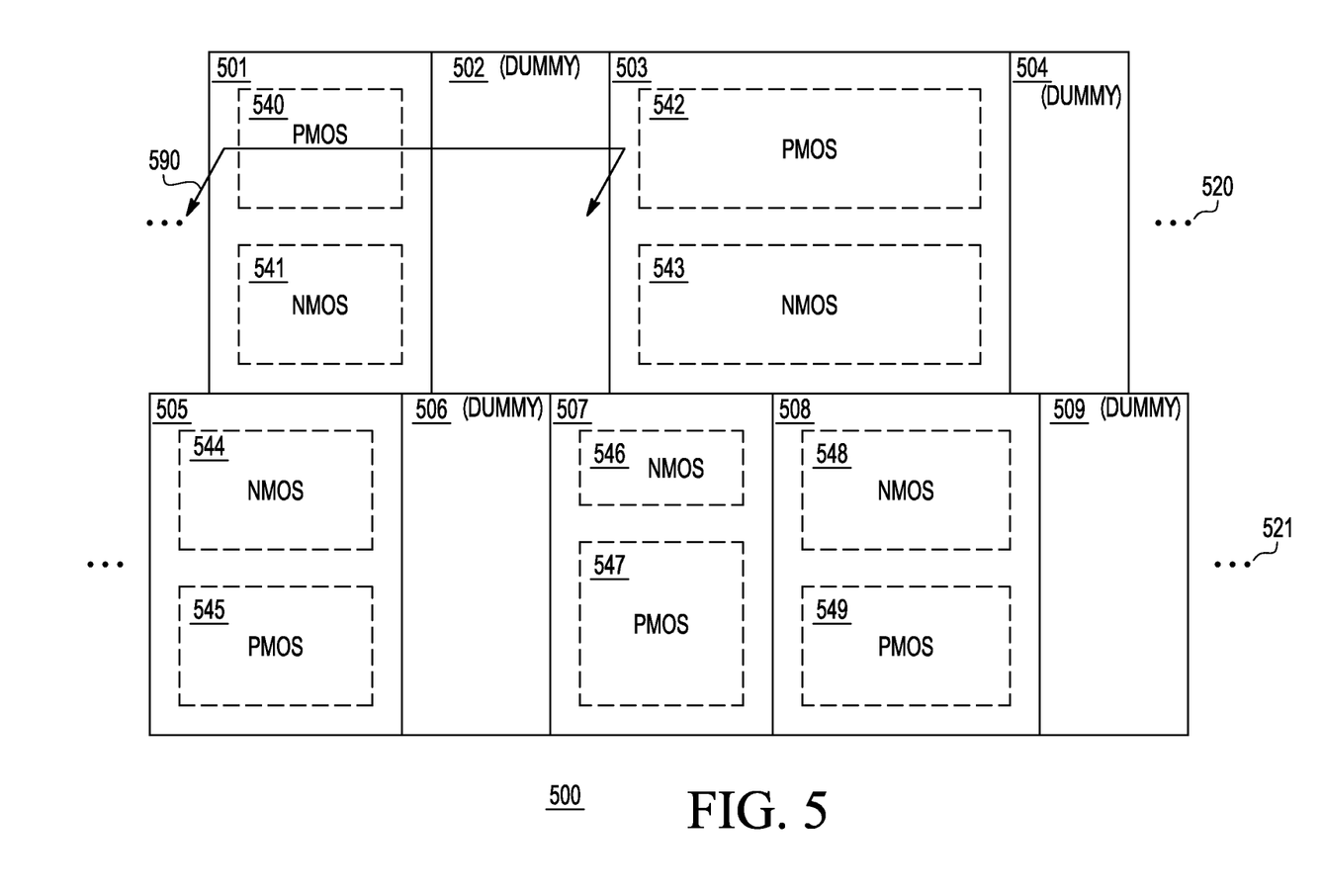
FIG. 5 is a block diagram illustrating a standard cell placement view of a portion of an integrated circuit data processing device design in accordance with a specific embodiment of the present disclosure.

FIG. 5 is a block diagram illustrating a standard cell placement view 500 of a portion of a device design in accordance with a specific embodiment of the present disclosure. Standard cell placement view 500 includes instantiations of standard cell LEF symbols, each LEF symbol corresponding to an instantiation of a standard cell circuit that is to be manufactured at that location of an integrated circuit. A placement application module, such as placement module 120, can provide the placement of individual LEF symbols at the device design. Standard cell placement view 500 illustrates a portion of a device design after placement module 120 has completed the placement operation, and before fill regions are added by fill module 150. Standard cell placement view 500 includes LEF symbols corresponding to standard cells 501, 503, 505, 507, and 508, and to dummy cells 502, 504, 506, and 509, arranged at two rows, including row 520, and 521. For the purpose of discussion, standard cell 501 can represent standard cell 200, previously described with reference to FIG. 2. Placement view 500 represents only a small portion of a complete integrated circuit design, which can include hundreds of thousands of individual standard cell instances.

Standard cells are typically organized in a plurality of rows at an integrated circuit data processing device design, wherein the height of each standard cell is typically the same as, or an integer multiple of, the height of the majority of other cells included at the standard cell library. The width of each standard cell can vary depending on the number and size of transistor devices included at the standard cell. Placement module 120 can determine the relative placement of standard cells in part based on the connectivity of each standard cell to other standard cells. Placement module 120 can also determine the relative placement of standard cells based on timing information provided by timing module 130. For example, placement module 120 can place standard cells that are included at a logic path having performance-critical timing behavior in close proximity to each other.

Also illustrated at standard cell placement view 500 are regions 540, 542, 545, 547, and 549 indicating the general location of p-channel transistors and regions 541, 543, 544, 546, and 548 indicating the general location of n-channel transistors at respective standard cells. The orientation of standard cells and dummy cells is typically flipped at alternating rows so that VSS and VDD metallization can be shared by neighboring rows. For example, cells 501-504 at row 520 are oriented with conductor VDD and p-channel transistors at the top of row 520, while cells 505-509 at row 521 are oriented with VDD with p-channel transistors and conductor VDD at the bottom of row 521. The locations of p-channel and n-channel transistors at each standard cell can vary, as can the height of a particular p-channel region. For example, region 547 occupies a greater percentage of the area of the standard cell 507 than region 546. Each LEF symbol can include information identifying the general location of p-channel and n-channel transistors for use by fill module 150. Standard cell placement view 500 also includes cross section 590.

Figure 6:
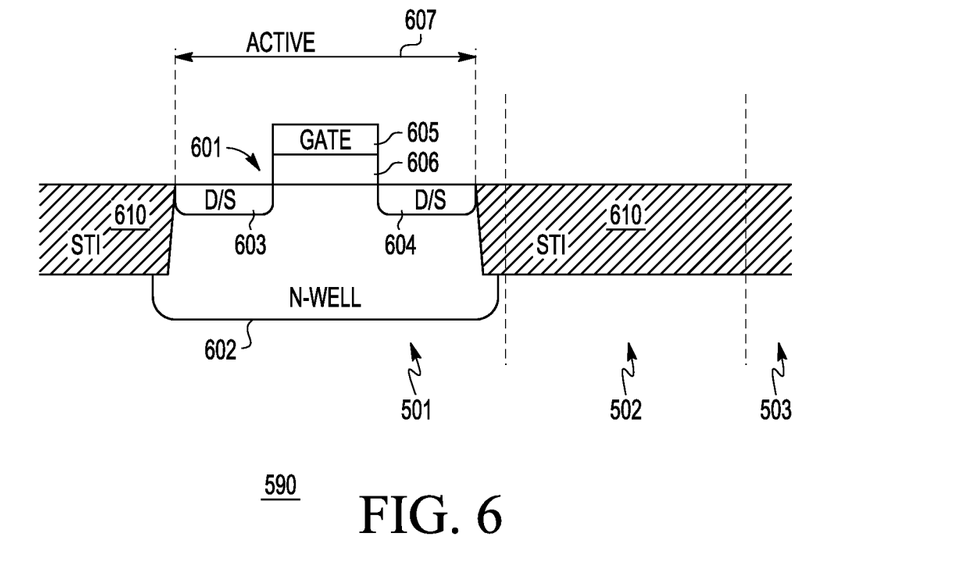
FIG. 6 is a cross sectional view of a portion of a completed integrated circuit data processing device in accordance with a specific embodiment of the present disclosure.

FIG. 6 is a cross sectional view 590 illustrating a portion of a completed integrated circuit data processing device in accordance with a specific embodiment of the present disclosure. Cross sectional view 590 illustrates, in a simplified form, a portion of a standard cell and an adjacent dummy cell, corresponding to LEF symbol 501 and 502, and a portion of standard cell 503, respectively. For clarity, only a single p-channel transistor 601 is illustrated. P-channel transistor 601 includes an n-well 602, and an active region 607 including drain/source diffusion regions 603 and 604, gate electrode 605, and gate dielectric 606. Surrounding p-channel transistor 601 is STI region 610. Furthermore, dummy cell 502 as illustrated at FIG. 6 includes exclusively STI region 610. STI region 610 can correspond to STI region 301 at FIG. 3 and STI region 401 at FIG. 4.

Figure 7:
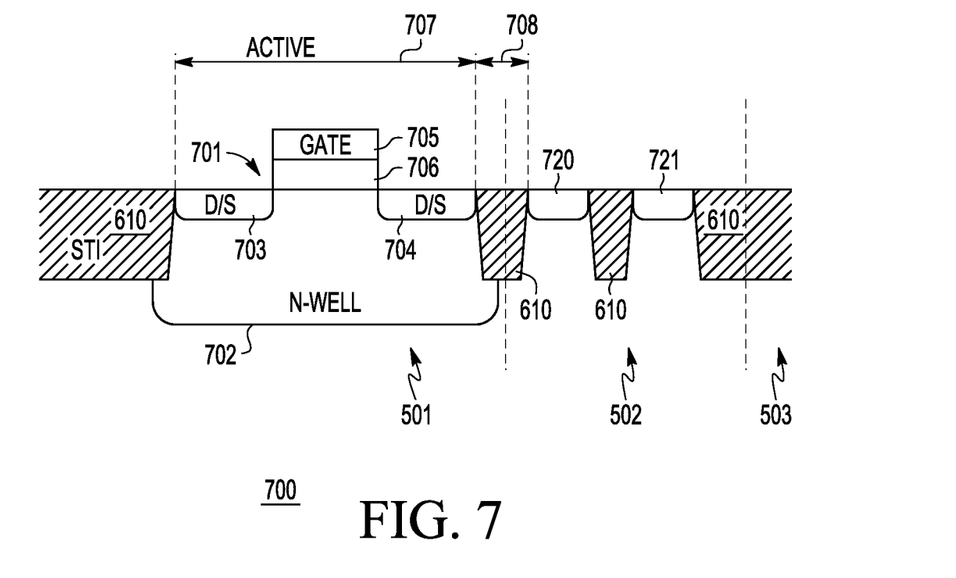
FIG. 7 is a cross sectional view of a portion of a completed integrated circuit data processing device following insertion of fill regions in accordance with a specific embodiment of the present disclosure.

FIG. 7 is a cross sectional view 700 of a portion of a completed integrated circuit data processing device following insertion of fill regions in accordance with a specific embodiment of the present disclosure. Cross sectional view 700 corresponds to cross sectional view 590 of FIG. 6 after the insertion of fill regions to reduce sub-threshold leakage of nearby transistors. Cross sectional view 700 illustrates a p-channel transistor 701 including an n-well 702, and an active region 707 including drain/source diffusion regions 703 and 704, gate electrode 705, and gate dielectric 706. Surrounding p-channel transistor 701 is STI region 610. As compared to cross section 590 of FIG. 6, fill regions 720 and 721 have been added at dummy cell 502. Fill regions 720 and 721 serve to reduce the area of STI 610 adjacent to p-channel transistor 701 and thereby reduce longitudinal compressive stress at p-channel transistor 701 that would otherwise be present in the absence of fill regions 720 and 721. Dimension 708 illustrates a width of a portion of STI 610 corresponding to at least a minimum permissible width STI design-rule (layout design guideline). For example, fill region 720 can not be located any closer to active region 707 without violating the STI layout design guideline. Stress induced at a transistor by nearby STI regions is related to the area of the respective STI regions and the proximity of the STI regions to the transistor. Therefore, stress at a transistor can be reduced by placing a fill region as close to an adjacent transistor as the STI design rule permits.

Figure 8:
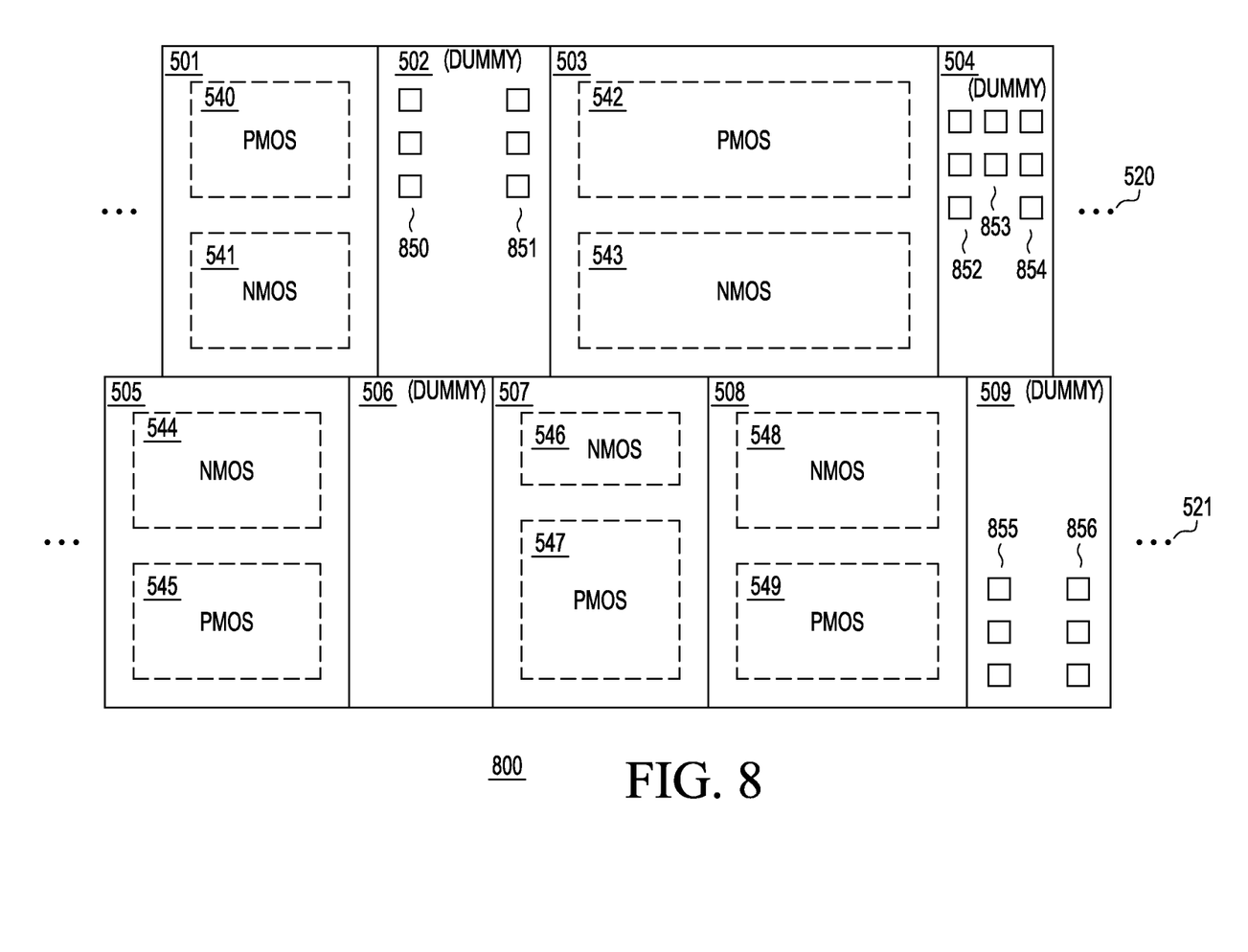
FIG. 8 is a block diagram illustrating a standard cell placement view of a portion of an integrated circuit data processing device design including fill regions in accordance with a specific embodiment of the present disclosure.

FIG. 8 is a block diagram illustrating a standard cell placement view 800 of a portion of an integrated circuit data processing device design including fill regions in accordance with a specific embodiment of the present disclosure. Placement view 800 can correspond to placement view 500 of FIG. 5 after fill module 150 has added fill regions at preferred locations. Standard cell placement view 800 includes LEF symbols corresponding to standard cells 501, 503, 505, 507, and 508, and to dummy cells 502, 504, 506, and 509, arranged at two rows, including row 520, and 521. Placement view 800 also includes sets of fill regions including sets 850-856. Placement view 800 includes regions 540, 542, 545, 547, and 549 indicating the general location of p-channel transistors, and regions 541, 543, 544, 546, and 548 indicating the general location of re-channel transistors.

As previously described, planarization module 140 (FIG. 1) analyzes successive portions of the device design to determine how many fill regions, if any, are required in each portion to satisfy active-layer density requirements. The size of each portion analyzed by planarization module 140 can vary based on manufacturing guidelines associated with a particular integrated circuit fabrication process. For example, planarization module 140 may divide the device design into a plurality of portions wherein each portion is 10,000 square-microns and may contain approximately 10,000 individual transistors. Planarization module 140 determines how many fill regions are required at each portion and fill module 150 (FIG. 1) identifies preferred locations at which to place the fill regions.

In one embodiment, fill module 150 is operable to preferentially place fill regions at selected locations of dummy cells based on determining which available location are expected to provide a greatest improvement in sub-threshold leakage characteristics of transistors included at nearby standard cells. As such, fill module 150 identifies a location for each fill region in a sequential manner, selecting the remaining location meeting a particular criterion, such as the location proving the greatest expected improvement in sub-threshold leakage until the total number of fill regions specified by planarization module 140, for each portion of the device design, are placed. Fill module 150 repeats this process for each portion of the device design identified by planarization module 140.

Fill module 150 can first identify a candidate location to place a fill region by determining which p-channel transistor (or alternatively, which standard cell) will most benefit from adding a nearby fill region, e.g., which transistor or cell is determined to have the greatest sub-threshold leakage in the absence of a nearby fill region. Because a fill region has a potential to decrease the rate at which a nearby p-channel transistor switches and thus negatively affect the operating frequency of an associated logic gate, fill module 150 does not place a fill region adjacent to a standard cell that is timing-critical. Timing information associated with each instantiation of a standard cell at the device design is provided by timing module 130. Accordingly, before fill module 150 places a fill region at a location adjacent to an instance of a standard cell, fill module 150 can determine whether the standard cell instance is timing-critical. A standard cell instance is determined to be timing-critical if the standard cell is included in one or more logic paths that meet a certain timing criterion, such as having an insufficient timing margin, where timing margin is a predefined minimum amount of positive slack associated with a logic path. For example, a standard cell instance can be considered timing-critical if any logic path that includes the standard cell instance has less than 100 picoseconds of positive slack. One skilled in the art will appreciate that fill module 150 evaluates each candidate location based on standard cells immediately adjacent to the left and to the right of the candidate location, if applicable. For example, fill module 150 will not place a fill region at a particular location if a standard cell on either side of that location is timing-critical. Similarly, fill module 150 will evaluate the merits of a candidate location based on the leakage characteristics of adjacent transistors to either side of that location, if applicable.

Only after exhausting opportunities to place fill regions adjacent to p-channel transistors will fill module 150 evaluate a location adjacent to an n-channel transistor. In particular, if a fill region must be placed adjacent to an n-channel transistor, priority is given to locations associated with n-channel transistors that will experience the least amount of increase in sub-threshold leakage because of the placement of the fill region. Furthermore, fill module 150 places the fill region as far from the n-channel transistor (or transistors) as is possible.

Standard cell placement view 800 illustrates the locations that fill module 150 has selected to place the finite number of fill regions allotted to this particular localized area. For the purpose of example, it is assumed that planarization module 140 has determined that no more than 20 fill regions are to be placed in the localized area illustrated at placement view 800. Furthermore, for this example fill module 150 has determined that either or both of standard cells 505 and 507 are associated with timing-critical delay paths. Therefore, fill module 150 does not place fill regions at dummy cell 506 adjacent to p-channel transistors. Instead, fill module 150 sequentially evaluates remaining locations that can receive a fill region to determine the best locations to place each fill region, until fill module 150 has placed all fill regions associated with this portion of the device design. For example, fill module 150 has successively determined that preferred locations to place fill regions are locations indicated by fill region sets 850-856. Furthermore, fill module 150 has determined that a greater reduction in sub-threshold leakage is realized when the available fill regions are first allocated to locations nearest to p-channel transistors, for example fill regions sets, such as 850, 851, 855, and 856, are preferentially placed closer to p-channel transistors. Only when there remain additional fill regions to be placed does fill module 140 place fill regions at locations within the STI regions that are further from the p-channel transistors, such as fill region set 853. Because suitable locations adjacent to p-channel transistors were identified to receive all of the required fill regions, it was not necessary for fill module 150 to place any fill regions adjacent to n-channel transistors.

One skilled in the art will appreciate that if more than 20 filler cells could be placed at this portion, it would be advantageous to do so in the regions between fill region set 850 and 851, and between fill region set 855 and 856, to further reduce stress induced leakage at standard cells 501 and 504, respectively. In addition, the size of each portion of the device design for which the preceding process is employed can be significantly larger than that represented by placement view 800. For example, planarization module 140 may specify that a particular number of fill regions are to be placed at a portion of the device design that includes hundreds or thousands of standard cells.

Figure 9:
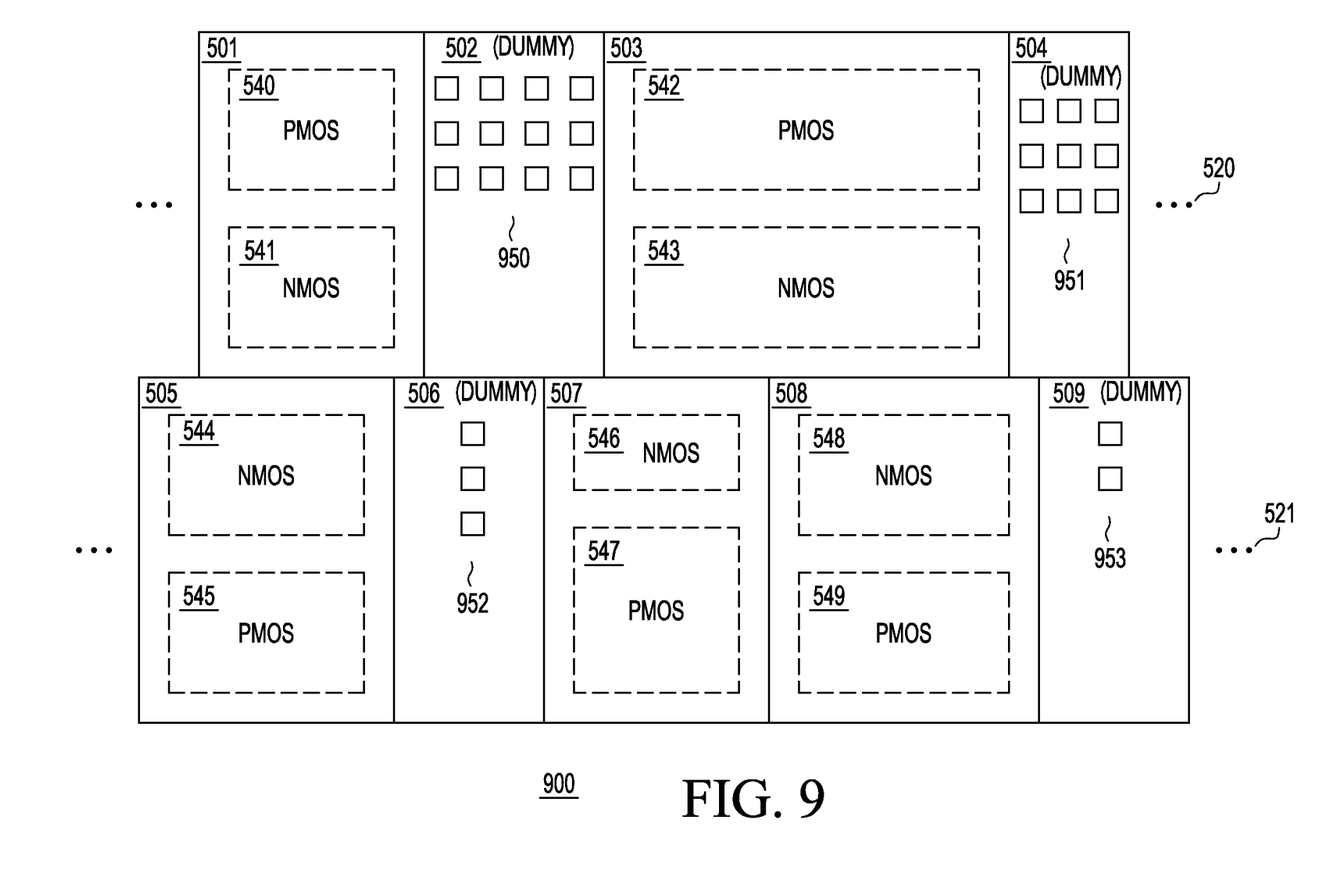
FIG. 9 is a block diagram illustrating a standard cell placement view of a portion of an integrated circuit data processing device design including fill regions in accordance with another embodiment of the present disclosure.

FIG. 9 is a block diagram illustrating a standard cell placement view 900 of a portion of an integrated circuit data processing device design including fill regions in accordance with another embodiment of the present disclosure. Placement view 900 can correspond to placement view 500 of FIG. 5 after fill module 150 has added fill regions at preferred locations. Standard cell placement view 900 includes LEF symbols corresponding to standard cells 501, 503, 505, 507, and 508, and to dummy cells 502, 504, 506, and 509, arranged at two rows, including row 520, and 521. Placement view 900 also includes sets of fill regions including sets 950, 951, 952, 953, and 954. Placement view 900 includes regions 540, 542, 545, 547, and 549 indicating the general location of p-channel transistors, and regions 541, 543, 544, 546, and 548 indicating the general location of n-channel transistors.

For the purpose of this example, it is assumed that planarization module 140 has determined that at least 26 fill regions are required in the localized area illustrated at placement view 900. Furthermore, for this example fill module 150 has determined that either or both of standard cells 905 and 907, as well as standard cell 908 are timing critical because they are included in at least one logic path that fails to meet a desired timing goal with an acceptable margin. Therefore, fill module 150 does not place fill regions adjacent to p-channel transistors at dummy cell 506 and 509. Instead, fill module 150 sequentially evaluates alternate locations to place fill regions, selecting a preferred location on the basis of determining that the location provides the greatest reduction in leakage when compared to other available locations, and repeats this process until all fill regions associated with this portion of the device design have been placed. In this example, all available locations at dummy cell 502 and 503 that are adjacent to p-channel transistors have been populated with fill regions, leaving an additional five fill regions that remain to be placed in this particular localized area. Because standard cells 505, 507, and 508 fail to satisfy the necessary timing requirements, fill module 150 determines that the only remaining locations available to place fill regions are adjacent to n-channel transistors. Because placing a fill region adjacent to an n-channel transistor can increase sub-threshold leakage at that transistor, fill module 150 places fill regions as far as possible from adjacent p-channel transistors, as illustrated by fill region sets 952 and 953 at FIG. 9. Furthermore, locations adjacent to n-channel transistors are each selected on the basis of minimizing any increase in sub-threshold leakage at nearby n-channel transistors resulting from placement of a fill region. For example, fill module 150 can utilize leakage information provided by characterization module 110 to identify locations for placing fill regions that are adjacent to standard cells having the least amount of leakage. One skilled in the art will appreciate that even if planarization module 140 indicates that additional fill cell can be placed at this portion, that it is not advantageous to do so, because additional fill regions at available locations can increase leakage associated with n-channel transistors or reduce the switching speeds of the timing critical standard cells.

Figure 10:
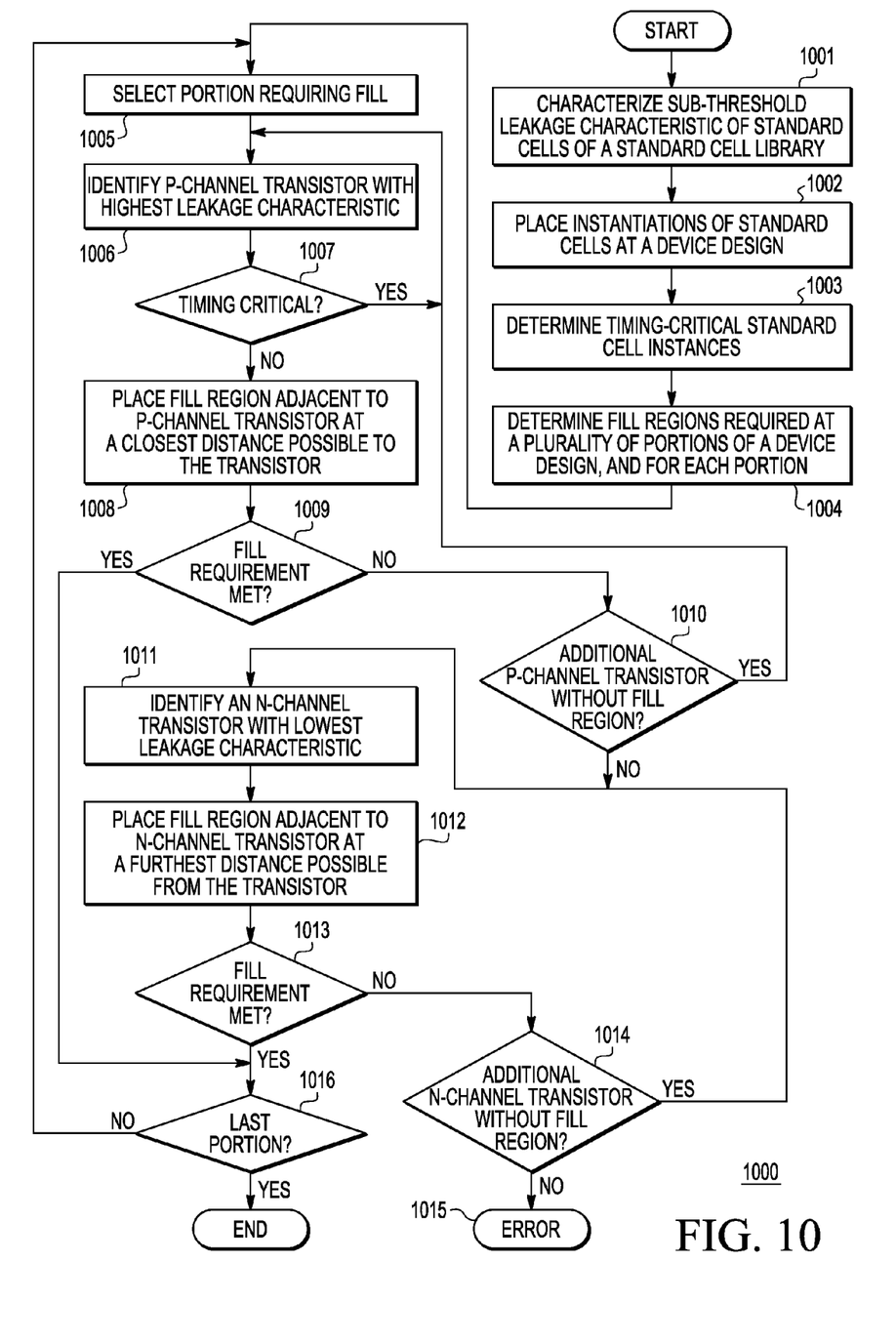
FIG. 10 is a flow diagram illustrating a method for placing fill regions at an integrated circuit data processing device design in accordance with specific embodiments of the present disclosure.

FIG. 10 is a flow diagram illustrating a method 1000 for placing fill regions at an integrated circuit data processing device design in accordance with specific embodiments of the present disclosure. Method 1000 begins at node 1001 where standard cells of a standard cell library are characterized to determine sub-threshold leakage characteristics of transistors included at each cell. For example, characterization module 110 can analyze each standard cell at standard cell library 106 and provide one ranking of the cells based on an amount of sub-threshold leakage of p-channel transistors included at each cell, and provide another ranking of the cells based on an amount of sub-threshold leakage of n-channel transistors included at each cell. The flow proceeds to node 1002 where instantiations of standard cells referenced by a device design are placed. For example, placement module 120 can determine a physical location at which to fabricate a circuit corresponding to each standard cell instance used to implement a device design. Placement module 120 can also instantiate dummy cells at selected locations adjacent to a portion of the standard cells to provide locations where fill regions can be subsequently placed.

The flow proceeds to node 1003 where timing-critical standard cell instances are determined. For example, timing module 130 can evaluate each instantiation of each standard cell at a device design and determine if that cell instantiation is included at a logic path having insufficient timing margin. A standard cell instantiation included in a logic path having a positive slack that is less than a predefined amount is determined to be timing-critical. The flow proceeds to node 1004 where a fill region requirement is determined for each of a plurality of portions of the device design. For example, planarization module 140 can divide the physical area occupied by the device design into multiple portions. Planarization module 140 can evaluate each portion individually to determine whether the density of selected physical features, such as active-layer density, satisfy a fabrication density guideline. Planarization module 140 can specify a number of fill regions that are to be added to each portion that fails to satisfy the guideline. The flow proceeds to node 1005 where a portion requiring the addition of fill regions is selected.

The flow proceeds to node 1006 where a p-channel transistor located at he selected portion and having the highest leakage characteristic is identified. For example, fill module 150 can evaluate sub-threshold leakage information provided by characterization module to determine which p-channel transistor included at the portion will most benefit from placement of an adjacent fill region. One skilled in the art will appreciate that only p-channel transistors included at standard cells that are also adjacent to a dummy cell need be considered, since fill regions are only placed at dummy cells. The flow proceeds to node 1007 where it is determined whether the selected p-channel transistor is included at a standard cell that is timing-critical. For example, fill module can evaluate timing information provided by timing module 130 to determine if the instance of the standard cell that includes the identified p-channel transistor is included at a logic path having insufficient timing margin. If the standard cell is determined to be a timing-critical standard cell, the flow returns to node 1006 where another p-channel transistor is identified. If however the standard cell is not timing-critical, the flow proceeds to node 1008 where a fill region is placed adjacent to the p-channel transistor identified at node 1005. For example, fill module 1005 can place a fill region at a dummy cell, adjacent to the identified p-channel transistor, and place the fill region as close to the p-channel transistor as STI design rules permit.

The flow proceeds to decision node 1009 where it is determined whether the fill requirement specified at node 1004 has been satisfied. If no additional fill regions remain to be placed at the present portion, the flow proceeds to decision node 1015 where it is determined whether another portion remains to be processed. If however additional fill regions are still required at the present portion, the flow proceeds to decision node 1010 where it is determined whether there are additional p-channel transistors adjacent to which fill regions can be placed. If additional p-channel transistors are identified, the flow returns to node 1006 where a next p-channel transistor is selected. If however no locations for placing a fill region adjacent to a p-channel are available, the flow proceeds to node 1011 where fill module 150 identifies a location adjacent to an n-channel transistor. In particular, fill module 150 selects an n-channel transistor having the lowest sub-threshold leakage characteristic of the available n-channel transistors. The flow proceeds to node 1012 where fill module 150 places a fill region adjacent to the n-channel transistor identified at node 1011, placing the fill region as far as possible from adjacent p-channel transistors.

The flow proceeds to decision block 1013 where it is determined whether all fill regions required at the present portion have been placed. If additional fill regions have yet to be placed at this particular portion, the flow proceeds to decision block 1014 where it is determined whether there are additional locations adjacent to n-channel transistors at which fill regions can be placed. If further locations are available, the flow returns to node 1011 where a next n-channel transistor is identified based on the same criterion as before. If no locations are identified at which to place the remaining fill regions associated with this portion, the flow proceeds to 1015 where an error condition is signaled alerting design engineers to the fact that an insufficient number of fill regions have been placed to satisfy design guidelines. In this situation, a waiver of the active-layer density design rule may be necessary, additional dummy cells can be added at this portion to accommodate the placement of additional fill regions, or further standard cell placement optimizations may be performed that address the density design rule violation. Returning to node 1013, if no fill regions remain to be placed at this portion, the flow proceeds to decision block 1015 where it is determined if there are other portions require fill regions. If there are still portions having an insufficient number of fill regions, the flow returns to node 1005 where another portion is selected for processing. If fill regions have been added to all portions, the flow is complete.

Figure 11:
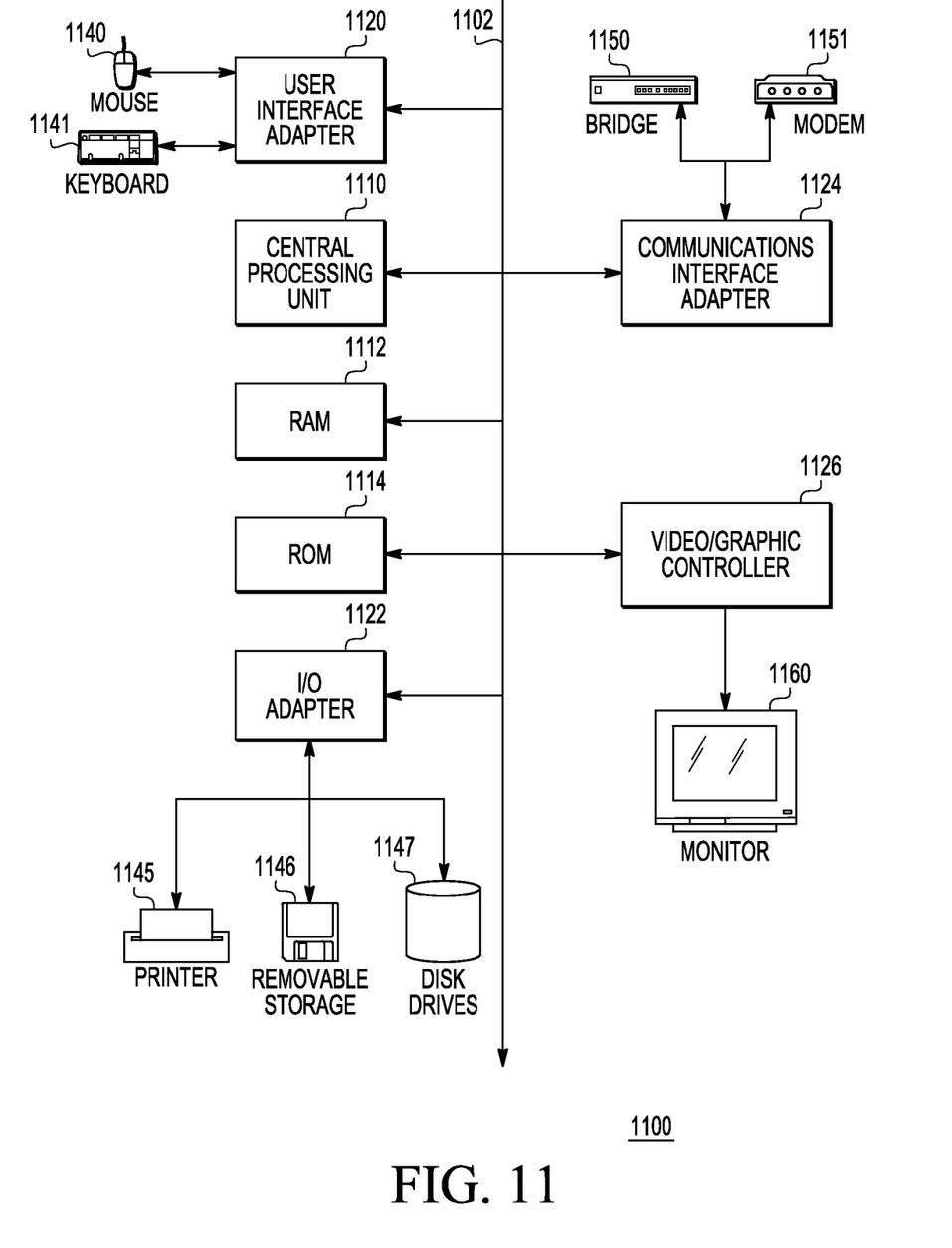
FIG. 11 is a block diagram illustrating a processing device in the form of a computer system in accordance with a specific embodiment of the present disclosure.

FIG. 11 is a block diagram illustrating a processing device in the form of a computer system 1100 in accordance with a specific embodiment of the present disclosure. Computer system 1100 is illustrated to include devices connected to each other a central processing unit 1110, which may be a conventional proprietary data processor, memory including a random access memory 1112, a read only memory 1114, and an input output adapter 1122, a user interface adapter 1120, a communications interface adapter 1124, and a multimedia controller 1126. Generally, system 1100 will be capable of implementing the system and methods described herein. For example, design file 104 to be accessed and manipulated by the method described herein can be stored at disk drive 1147 or at memory 1112 and accessed by CPU 1110 in response to an instruction.

Input output (I/O) adapter 1122 is further connected to, and controls, disk drives 1147, printer 1145, removable storage devices 1146, as well as other standard and proprietary I/O devices. User interface adapter 1120 can be considered a specialized I/O adapter. Adapter 1120 is connected to a mouse 1140, and a keyboard 1141. In addition, user interface adapter 1120 may be connected to other devices capable of providing various types of user control, such as touch screen devices. Communications interface adapter 1124 is connected to a bridge 1150 such as is associated with a local or a wide area network, and a modem 1151. System bus 1102 can be connected to various communication devices to access external information. Multimedia controller 1126 will generally include a video graphics controller capable of displaying images upon the monitor 1160, as well as providing audio to external components (not illustrated).

Figure 12:
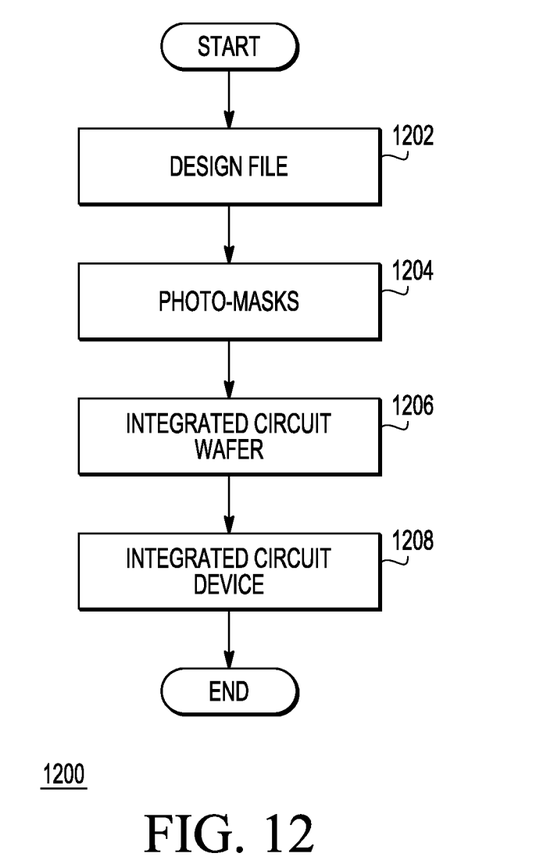
FIG. 12 is a flow diagram illustrating another method in accordance with a specific embodiment of the present disclosure.

FIG. 12 is a flow diagram illustrating a method in accordance with a specific embodiment of the present disclosure. At node 1202 information included at a design file, such as design file 104, is provided to a photo-lithography facility. For example, design file 104 can include information representing features of the completed integrated circuit such as feature 2011 and feature 2012 of FIG. 3. The flow proceeds to node 1204 where photo-masks are manufactured and provided to an integrated circuit wafer-fabrication facility. The flow proceeds to node 1206 where an integrated circuit wafer is manufactured using the photo-masks. The flow proceeds to node 1208 where integrated circuit devices are manufactured from integrated circuit die included at the integrated circuit wafer.

In a first aspect, a method implemented at a computer aided design tool includes preferentially placing fill regions adjacent to transistors of a first conductivity type for a plurality of standard cell instances of a device design to reduce leakage of the plurality of standard cell instances. Preferentially placing the fill regions includes preferentially placing the fill regions adjacent to transistors of a first conductivity type as compared to placing the fill regions adjacent to transistors of a second conductivity type that is opposite the first conductivity type. In one embodiment of the first aspect, the transistors of the first conductivity type include p-channel transistors. In another embodiment of the first aspect, preferentially placing fill regions includes identifying an available location within a field isolation region. In still another embodiment of the first aspect, preferentially placing fill regions includes identifying an available location within a field isolation region.

In another embodiment of the first aspect, preferentially placing the fill regions includes evaluating substantially all transistors of the first conductivity type for the plurality of standard cells prior to evaluating substantially any transistors of the second conductivity type for the plurality of standard cells, and for each transistor being evaluated, determining if a criterion is met, and placing the fill region adjacent to the transistor being evaluated in response to the criterion being met. In still another embodiment of the first aspect, preferentially placing the fill region includes placing the fill region a distance from a diffusion region of the adjacent transistor that is substantially equal to a value corresponding to a minimum permissible width of an STI feature. In yet another embodiment of the first aspect, determining if a transistor meets the criterion includes determining whether a standard cell that includes the transistor satisfies a timing criterion. In another embodiment of the first aspect, determining if the standard cell that includes the transistor satisfies the timing criterion includes determining that each logic path of the device design that includes the standard cell operates with a timing margin greater than a predefined amount. In still another embodiment of the first aspect, the plurality of standard cell instances includes more than 1000 instances.

In another embodiment of the first aspect, preferentially placing fill regions includes placing fill regions after placing substantially all standard cell instances of a device design, and wherein the placement locations of the substantially all standard cell instances are not modified by placing fill regions. In another embodiment of the first aspect, the plurality of standard cell instances are determined based upon an active-layer density analysis performed on each portion. In a further embodiment of the first aspect, preferentially placing the fill regions further includes preferentially placing a fill region adjacent to a first transistor of the first conductivity type before placing a fill region adjacent to a second transistor of the first conductivity type based on determining that the first transistor has higher leakage than does the second transistor. Another embodiment of the first aspect includes placing fill regions adjacent to transistors of the second conductivity type only after exhausting opportunities to place fill regions adjacent to transistors of the first conductivity type, and only when additional fill regions are required to be placed.

In a second aspect, an integrated circuit data processing device includes a plurality of standard cell instances, each standard cell instance including a first p-channel transistor and a first n-channel transistor, a plurality of fill regions defined within field isolation regions, wherein a majority of the fill regions are in closer physical proximity to p-channel transistors than they are to n-channel transistors, and wherein the fill regions are to reduce leakage at the p-channel transistors. In an embodiment of the second aspect, each fill region corresponds to a region having an absence of field isolation material. In another embodiment of the second aspect, the fill regions are longitudinally adjacent to p-transistors of instances of standard cells. In yet another embodiment of the second aspect, a majority of fill regions adjacent to p-channel transistors are located at a distance from a diffusion region of the corresponding p-channel transistor that does not exceed four times the value of a minimum permissible width of an STI feature.

In a third aspect, a computer readable medium embodies a software program. The software program includes executable instructions configured to manipulate at least one processor to, for a plurality of standard cell instances of a device design, place fill regions adjacent to transistors of a first conductivity type to reduce leakage of the transistors of a first conductivity type. Fill regions are placed adjacent to the transistors of the first conductivity type is done preferentially as compared to placing the fill regions adjacent to transistors of a second conductivity type that is opposite the first conductivity type. In an embodiment of the third aspect, the software program is further configured to manipulate the at least one processor to evaluate substantially all transistors of the first conductivity type for the plurality of standard cells, prior to evaluating substantially any transistor of the second conductivity type for the plurality of standard cells, and for each transistor being evaluated, determining if a criterion is met, and placing the fill region adjacent to the transistor being evaluated in response to the criterion being met. In another embodiment of the third aspect, the transistors of the first conductivity type include p-channel transistors. In yet another embodiment of the third aspect, placing fill regions includes identifying an available location within a field isolation region.

In a fourth aspect, a device includes a memory and a fill module coupled to the memory. The fill module is operable to identify transistors of a first conductivity type at instance of standard cells of a device design, the standard cells including transistors of a first conductivity type and transistors of a second conductivity type that is opposite the first conductivity type, and place fill regions adjacent to transistors of the first conductivity type preferentially, as opposed to placing fill regions adjacent to transistors of the second conductivity type, at locations that reduce leakage of the transistors of the first conductivity type. In an embodiment of the fourth aspect, the device includes a planarization module coupled to the memory, the planarization module operable to determine how many fill regions are to be placed at a portion of a device design based on an analysis of the layout density of active-layer features at the portion.

In another embodiment of the fourth aspect, the device includes a placement module coupled to the memory, the placement module operable to place instantiations of a standard cells and dummy cells at the device design. In still another embodiment of the fourth aspect, placing fill regions preferentially is further to place fill regions adjacent to transistors having greater leakage before placing fill regions adjacent to transistor having relatively less leakage. In yet another embodiment of the fourth aspect, to place fill regions preferentially is further to place fill regions adjacent to transistors based on determining that the transistors are associated with logic paths having a predefined amount of timing margin. In a further embodiment of the fourth aspect, the transistor of the first conductivity type is a p-channel transistor.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method implemented at a computer aided design tool comprising:
  preferentially placing fill regions adjacent to transistors of a first conductivity type for a plurality of standard cell instances of a device design to reduce leakage of the plurality of standard cell instances, wherein preferentially placing fill regions further comprises:
    evaluating, using a computer, all transistors of the first conductivity type for the plurality of standard cell instances prior to evaluating any transistors of a second conductivity type for the plurality of standard cell instances, the second conductivity type opposite the first conductivity type; and
    for each transistor being evaluated, determining if a criterion comprising a design rule that governs surface planarity is met, and placing the fill region within a field isolation region and adjacent to the transistor being evaluated in response to the criterion being met.

2. The method of claim 1, wherein the transistors of the first conductivity type comprise p-channel transistors.

3. The method of claim 1, wherein preferentially placing fill regions comprises identifying an available location within a field isolation region.

4. The method of claim 1, wherein preferentially placing the fill region comprises placing the fill region a distance from an active region of the adjacent transistor that is equal to a value corresponding to a minimum permissible width of a shallow trench isolation feature.

5. The method of claim 1, wherein determining if a transistor meets the criterion further comprises determining whether a standard cell that includes the transistor satisfies a timing criterion.

6. The method of claim 5, wherein determining if the standard cell that includes the transistor satisfies the timing criterion comprises determining that each logic path of the device design that includes the standard cell operates with a timing margin greater than a predefined amount.

7. The method of claim 1, wherein the plurality of standard cell instances includes more than 1000 standard cell instances.

8. The method of claim 1, wherein preferentially placing fill regions comprises placing fill regions after placing substantially all standard cell instances of a device design, and wherein the placement locations of the substantially all standard cell instances are not modified by placing fill regions.

9. The method of claim 1, wherein preferentially placing the fill regions further comprises preferentially placing a fill region adjacent to a first transistor of the first conductivity type before placing a fill region adjacent to a second transistor of the first conductivity type based on determining that the first transistor has higher leakage than does the second transistor.

10. The method of claim 9, further comprising placing fill regions adjacent to transistors of the second conductivity type only after exhausting opportunities to place fill regions adjacent to transistors of the first conductivity type, and only when additional fill regions are required to be placed.

11. An integrated circuit data processing device comprising:
  a plurality of standard cell instances, each standard cell instance including a first p-channel transistor and a first n-channel transistor; and
  a plurality of fill regions defined within field isolation regions, wherein a majority of the fill regions is in closer physical proximity to p-channel transistors than to n-channel transistors and located at a distance from an active diffusion region of the corresponding p-channel transistor that does not exceed four times the value of a minimum permissible width of a shallow trench isolation feature, and wherein each fill region fills an opening of the field isolation region.

12. The device of claim 11, wherein the majority of the fill regions are to reduce leakage at the p-channel transistors.

13. The device of claim 11, wherein the majority of fill regions are longitudinally adjacent to p-channel transistors of instances of standard cells, wherein a longitudinal direction corresponds to a direction of current flow between a drain and a source of respective p-channel transistors.

14. The device of claim 11, wherein the average density of the fill regions at the integrated circuit data processing device is greater at locations longitudinally adjacent to the p-channel transistors than the average density of the fill regions at locations longitudinally adjacent to the n-channel transistors, wherein a longitudinal direction corresponds to a direction of current flow between a drain and a source of respective p-channel transistors.

15. The device of claim 11, wherein each of the field isolation regions is located contiguous to a selected standard cell of the plurality of standard cells.

16. A non-transitory computer readable medium embodying a software program, the software program comprising executable instructions configured to manipulate at least one processor to:
identify transistors of a first conductivity type at instance of standard cells of a device design, the standard cells including transistors of a first conductivity type and transistors of a second conductivity type that is opposite the first conductivity type; and
place fill regions adjacent to transistors of the first conductivity type preferentially, as opposed to placing fill regions adjacent to transistors of the second conductivity type, at locations that reduce leakage of the transistors of the first conductivity type, wherein preferentially placing fill regions further comprises placing fill regions adjacent to transistors of the second conductivity type only after exhausting opportunities to place fill regions adjacent to transistors of the first conductivity type, and only when additional fill regions are required to be placed based on a criterion comprising a design rule that governs surface planarity.

17. The computer readable medium of claim 16, wherein to place fill regions preferentially is further to place fill regions adjacent to transistors having greater leakage before placing fill regions adjacent to transistor having relatively less leakage.

18. The computer readable medium of claim 16, wherein to place fill regions preferentially is further to place fill regions adjacent to transistors based on determining that the transistors are associated with logic paths having a predefined amount of timing margin.

* * * * *